ACCELERATING THE LYSIS OF BLOOD CLOTS WITH UROKINASE AND N-GLYCYLPYRROLIDINE OR SALT THEREOF

Robert Phillip Johnson, Jacksonville, Fla., assignor to Abbott Laboratories, Chicago, Ill.
No Drawing. Continuation-in-part of application Ser. No. 771,370, Oct. 28, 1968. This application June 19, 1970, Ser. No. 47,909
Int. Cl. A61k 19/00, 27/00
U.S. Cl. 424—94     5 Claims

ABSTRACT OF THE DISCLOSURE

N-Glycylpyrrolidine and its salts have been found to potentiate blood clot lysis induced by urokinase when a combination of urokinase and this substituted pyrrolidine is brought in contact with clots of blood from vertebrate animals.

CROSS-REFERENCE TO RELATED APPLICATIONS

This application is a continuation-in-part of my earlier filed application, Ser. No. 771,370, filed on Oct. 28, 1968, now abandoned.

DETAILED DESCRIPTION OF THE INVENTION

This invention relates to novel compositions of matter involving the combination of urokinase and N-glycylpyrrolidine or salts thereof and to a method employing such compositions in order to accelerate the lysis of blood clots.

Urokinase is a complex protein of unknown structure which is found in human urine in trace amounts. It is an effective, but slowly acting blood clot lysing agent when injected in amounts far greater than those which exist naturally in urine. Methods of recovering urokinase from human urine are known, but because urokinase is present there only in minute amounts, its isolation from urine is extremely expensive. Furthermore, because relatively large amounts of urokinase are needed for the dissolution of a blood clot with this agent, the discovery of this activity for urokinase is only of research interest and has little practical value, unless agents are found which can be employed in conjunction with urokinase in order to speed up the lysing process and reduce the amount of urokinase required to dissolve a blood clot.

For the purpose of the present invention, the term "urokinase" is meant to include that component or those components present in the blood vessels of vertebrates which exhibit the clot-lysing ecect commonly ascribed to urokinase. Such components, whether similar in structure or totally different from urokinase, are thus to be understood as being included in the term "urokinase."

It is an object of the present invention to provide novel compositions of matter which, when brought into contact with a vertebrate blood clot, will materially accelerate the lysis of such a clot as compared to the use of urokinase alone for this purpose. Another object of this invention is to provide a method employing the novel compositions of matter herein disclosed which will decrease the cost and time needed to dissolve a blood clot. A further object is the process of lysing a blood clot by softening such a clot prior to treating it with urokinase. A still further object of this invention is the provision of a two-step treatment method for warm-blooded animals suffering from clot obstructions in their blood stream.

These and other objects are accomplished by providing a composition of matter comprising urokinase and N-glycylpyrrolidine and water-soluble, non-toxic acid addition salts thereof and a method for treating a vertebrate blood clot with urokinase and N-glycylpyrrolidine. The N-glycylpyrrolidine may enhance the effect of urokinase on a blood clot by softening the clot and making it easier for urokinase to act thereon and promoting lysis of the clot in a much shorter period of time, or it may affect an inhibitor of the urokinase activity in the blood. The empirical fact is that the amount of urokinase required for clot lysing is drastically reduced when combined with the above N-glycylpyrrolidine. The dramatic effect obtained by the disclosed combination of reagents can be demonstrated both in vitro and in vivo.

The exact amount of the N-glycylpyrrolidine base or salt used as potentiator per unit of urokinase is not critical; good results are obtained when at least 0.1 micromole of said base or salt is employed per CTA unit of urokinase activity. (One CTA unit is the standard unit of urokinase activity established by the National Heart Institute Committee on Thrombolytic Agents; Fletcher et al., J. Lab. Clin. Med., 65, 713–31, May 1965.) Most effective results are observed with ratios of N-glycylpyrrolidine to urokinase between 0.3 and 3.0 micromoles per CTA unit; however, good results are obtained within the range of 0.1–5.0 micromoles per CTA unit. The combination of these agents may be employed as such or the blood clot can be treated first with N-glycylpyrrolidine and then with urokinase solution, optionally followed with additional doses of N-glycylpyrrolidine.

The invention is more clearly understood by reference to the following examples which show the surprising and unexpected results obtained with the new compositions. These examples, however, are illustrations only and are not to be construed as restrictive.

Example 1

The experiment to determine the activity of the new composition was carried out as follows: human fibrinogen labeled with radioactive iodine $I^{125}$ was prepared by the method of Rosa et al., Biochim. Biophys. Acta 86, 519 (1964). A solution of this fibrinogen was added to human plasma obtained by known methods. The well-stirred mixture was divided into 1.0 ml. aliquots in test tubes. The labeled fibrinogen was converted to fibrin clots by adding thrombin to each tube and immediately spinning a groundglass rod in each mixture for 15 seconds. The formed clots adhered to the glass rods and were allowed to age approximately one hour; they were then freed of serum by pressing them against the walls of the test tubes. The clots were stored on the glass rods in their own serum at −20° C. until needed.

It is known that each batch of pooled plasma and of fibrin clots differs in susceptibility of activation of the fibrinolytic system by urokinase. It was, therefore, necessary to standardize each batch individually. This was accomplished as follows: to a series of test tubes was added 1.5 ml. of human plasma and 0.1 ml. of urokinase solutions varying in concentrations from 0 to 500 CTA units per ml. One of the $I^{125}$ labeled fibrin clots described above was added to each tube and the tubes were incubated for 20 hours at 30° C. with gentle shaking. The plasma was then freed of any solid clot particles and measured for its $I^{125}$ content. Maximum possible lysis was established by measuring total radioactivity present in the solution after digesting control clots with sodium hydroxide. The degree of lysis brought about by urokinase solutions was then determined as stated and expressed as the percentage of the maximum possible radioactivity which can be solubilized with sodium hydroxide. The concentration of the various urokinase solutions used was plotted against the percent lysis they caused and that concentration of urokinase which affected about 10% lysis under these conditions was determined from the resulting graph. Usually, this concentration falls within the range of from 150 to 250 CTA units/ml. of solution.

For evaluation of fibrinolytic enhancement, 0.1 ml. of the urokinase solution which produces approximately 10% lysis was added to 1.5 ml. of plasma containing 1.5 mg. (about 9.1 micromoles) of N-glycylpyrrolidine hydrochloride. Incubation with the labeled clot and determination of percent lysis was carried out as described above. Each test was run in duplicate in one experiment and two tubes without added test compound were run simultaneously to serve as a control for the experiment. The two values obtained with the test compound were 76 and 77% respectively in the duplicate experiments (maximum possible lysis is 100%) with the values for the controls being 9 and 10% lysis, respectively.

Although the N-glycylpyrrolidine used above for the indicated tests was in the form of its hydrochloride salt, the free base and other non-toxic salts thereof produce almost identical results when used in equimolar amount. Among the non-toxic acid addition salts, the phosphate, sulfate, hydrochloride, acetate, fumarate, citrate and succinate salts are preferred.

Example 2

By using the procedure of the preceding example, the compound of Example 1 was used in various amounts together with a constant amount of urokinase. A urokinase solution giving 5-9% lysis (14-29 CTA units per ml. of plasma) was tested within a range of from 0.33 to 8 mg. of N-glycylpyrrolidine hydrochloride (2.0–50 micromoles) per milliliter of plasma. Significant urokinase enhancement was observed over the whole range. For example, with 0.5 mg./ml. of N-glycylpyrrolidine hydrochloride, 62% lysis was observed (control=5% lysis with 14 CTA units); at 0.33 mg./ml., 20% lysis occurred (control=9% lysis with 29 CTA units) and at 1 mg./ml., lysis is 96% of theory (control=16% lysis with 28 CTA units).

Example 3

In an anesthesized dog, the jugular vein was isolated. By passing an electric current across the vein through a pair of electrodes placed on the outside of the vein, blood flow reduced rapidly and finally stopped due to the formation of a blood clot.

The dog was initially injected intravenously through a leg vein with 72 mg./kg. of N-glycylpyrrolidine hydrochloride and half of the critical dose of urokinase in water and then infused through the opposite jugular vein with an aqueous solution of the same salt at a rate of 0.2 mg./kg./min. for 16 hours. The dog received no further treatment. The blood flow was restored and the vein remained open through the seventh day.

In a repetition of this experiment but using only half the above doses of the test compound (36 mg./kg./day by injection and 0.1 mg./kg./min. for 16 hours by infusion), the same result was obtained.

The above reference to "critical dose" means the dose as established and explained by Tsapogas & Flute in Brit. Med. Bull., vol. 20, No. 3 on page 224 (1964).

The above experiments clearly show the excellent potentiation of the lysing effect of urokinase with N-glycylpyrrolidine. Urokinase is actually used in extremely small amounts and only relatively small amounts of the new potentiator are required for the desired clot lysing effect. It will be readily understood by those skilled in the art that quantities of urokinase much smaller than those mentioned above may be employed since an activator (acting as urokinase) is already present in the blood vessels of animals. The above examples also shown that the fibrinolytic activity is enhanced in the in vivo system for which the new composition is designed: the blood clots used in above Examples 1 and 2 are basically identical to those formed in the blood of warm-blooded animals.

For treatment of a clot actually present in the blood vessel of a warm-blooded animal, the composition of this invention is administered parenterally or orally, preferably intravenously. The process of the present invention can be carried out in several ways. For instance, the enhancer can be administered together with urokinase or it can be administered prior to the administration of urokinase and, if desired, may be followed by subsequent doses of the enhancer by parenteral and/or oral administration. In animals, an excellent treatment schedule is as follows: N-glycylpyrrolidine or a non-toxic salt thereof is administered intravenously or orally after establishing that a clot is present in the blood stream. Subsequently or simultaneously, one-half the usual dose of urokinase or less is administered intravenously and, if desired, one or more further doses of the above enhancer is given on subsequent days, for instance, by infusion extended over a period of several days.

The N-glycylpyrrolidine used in the present invention is prepared as follows: a mixture of 98 g. of 1-(α-chloroacetyl)-pyrrolidine and 1000 ml. of concentrated aqueous ammonia solution is stirred for 1 hour during which time the mixture becomes homogeneous. Excess ammonia is evaporated under reduced pressure and the residue is acidified with dilute hydrochloric acid. Unchanged starting material is removed by extraction with dichloromethane and the aqueous layer is then made basic with a potassium hydroxide solution and again extracted with dichloromethane. This extract is dried and, after evaporation of the solvent, the crude amine remains; it is dissolved in 200 ml. of dry benzene and dry hydrogen chloride is passed through. The precipitated salt of N-glycylpyrrolidine is collected, washed with dry acetone and recrystallized from dichloromethane to yield 42 g. (56% of theory) of the pure compound melting at 170-2° C.

For a practical dosage form, urokinase and N-glycylpyrrolidine may be combined for an injectable solution or processed into a tablet using the usual excipients, including release retardents. In a unit dosage form of this kind, the ratio between N-glycylpyrrolidine and urokinase is best selected in a ratio of between 0.1 and 0.5 micromoles of the glycylpyrrolidine base or a non-toxic salt thereof per CTA unit of urokinase. Injectable solutions are preferably adjusted to a pH of 7 or slight above with tri(hydroxymethyl)aminomethane or a similar non-toxic, pharmaceutically acceptable buffer. The new urokinase potentiating compound is of particular value because of its extremely low toxicity. For instance, the oral and intraperitoneal $LD_{50}$ in mice is above 1 g./kg. while the intraveneous $LD_{50}$ in mice is about 900 mg./kg.

I claim:
1. The method of enhancing the lysis of a vertebrate blood clot which comprises contacting said clot with urokinase in an amount which produces 10% lysis and N-glycylpyrrolidine or a water-soluble non-toxic acid addition salt thereof, wherein 0.1–5 micromoles of said N-glycylpyrrolidine is employed per CTA unit of urokinase activity.

2. The process of claim 1 wherein said blood clot is first contacted with N-glycylpyrrolidine and subsequently with urokinase.

3. A composition for accelerating the lysis of a vertebrate blood clot consisting essentially of urokinase and N-glycylpyrrolidine or a water-soluble non-toxic acid addition salt thereof, in which 0.1–5 micromoles of said N-glycylpyrrolidine per CTA unit of urokinase activity is present.

4. The composition of claim 3 wherein the ratio between said N-glycylpyrrolidine and urokinase is between 0.3 and 3.0 micromoles of said N-glycylpyrrolidine per CTA unit of urokinase activity.

5. The composition of claim 3 in unit dosage form together with a pharmaceutically acceptable carrier.

References Cited

UNITED STATES PATENTS 3,294,641  12/1966  Lorand _____ 424—94

FOREIGN PATENTS 563,660  9/1958  Canada _____ 424—274

OTHER REFERENCES

Chemical Abstracts, Formula Index, July-December 1969, p. 199F.

ALBERT T. MEYERS, Primary Examiner

N. A. DREZIN, Assistant Examiner

U.S. Cl. X.R.

424—274